US011666041B2

(12) United States Patent
Klokkersund

(10) Patent No.: US 11,666,041 B2
(45) Date of Patent: Jun. 6, 2023

(54) FISH POT

(71) Applicant: Mørenot Fishery AS, Søvik (NO)

(72) Inventor: Hallvard Klokkersund, Ålesund (NO)

(73) Assignee: MØRENOT FISHERY AS, Ålesund (NO)

( * ) Notice: Subject to any disclaimer, the term of this patent is extended or adjusted under 35 U.S.C. 154(b) by 295 days.

(21) Appl. No.: 16/689,803

(22) Filed: Nov. 20, 2019

(65) Prior Publication Data
US 2021/0144981 A1    May 20, 2021

(51) Int. Cl.
*A01K 69/08*    (2006.01)
*A01K 69/10*    (2006.01)

(52) U.S. Cl.
CPC ............ *A01K 69/10* (2013.01); *A01K 69/08* (2013.01)

(58) Field of Classification Search
CPC ........ A01K 69/00; A01K 69/06; A01K 69/08; A01K 69/10
USPC ................................... 43/100–106
See application file for complete search history.

(56) References Cited

U.S. PATENT DOCUMENTS

| 3,508,358 | A | * | 4/1970 | Lee ........................ | A01K 69/06 43/60 |
| 3,638,346 | A | * | 2/1972 | Stein ...................... | A01K 74/00 43/17.1 |
| 4,134,226 | A | * | 1/1979 | Petrella .................. | A01K 69/06 43/102 |
| 4,141,172 | A | * | 2/1979 | Prosol .................... | A01K 69/06 43/105 |
| 4,156,984 | A | * | 6/1979 | Kinser, Sr. ............. | A01K 69/10 43/105 |
| 4,237,645 | A | * | 12/1980 | Kinser ................... | A01K 69/06 43/102 |
| 4,354,325 | A | * | 10/1982 | Aho ....................... | A01K 69/10 43/105 |
| 4,530,182 | A | * | 7/1985 | Ponzo .................... | A01K 69/08 43/102 |
| 4,739,579 | A | * | 4/1988 | Jakimas ................. | A01K 69/06 43/103 |
| 5,207,017 | A | * | 5/1993 | Litrico .................. | A01K 69/10 43/100 |
| 5,287,647 | A | * | 2/1994 | Longo ................... | A01K 69/06 43/100 |
| 7,533,486 | B2 | * | 5/2009 | Ribeiro De Matos ...................... | A01K 69/10 43/105 |
| 2019/0098881 | A1 | * | 4/2019 | Al-Farhan ............. | A01K 71/00 |

FOREIGN PATENT DOCUMENTS

| CN | 206835974 | | 1/2018 |
| NO | 325514 | | 6/2008 |
| WO | WO 89/04603 | * | 6/1989 |
| WO | 2008/105665 | | 9/2008 |

OTHER PUBLICATIONS

Search Report dated Apr. 17, 2020 in corresponding Norwegian Patent Application No. 20191381.

* cited by examiner

*Primary Examiner* — David J Parsley
(74) *Attorney, Agent, or Firm* — Wenderoth, Lind & Ponack, L.L.P.

(57) ABSTRACT

An extendable pot for catching fish includes a frame structure comprising a main frame structure and an extendable frame structure, with the extendable frame structure comprising a number of floating elements extending the extendable frame structure out from the main frame structure when the pot is immersed in water.

6 Claims, 3 Drawing Sheets

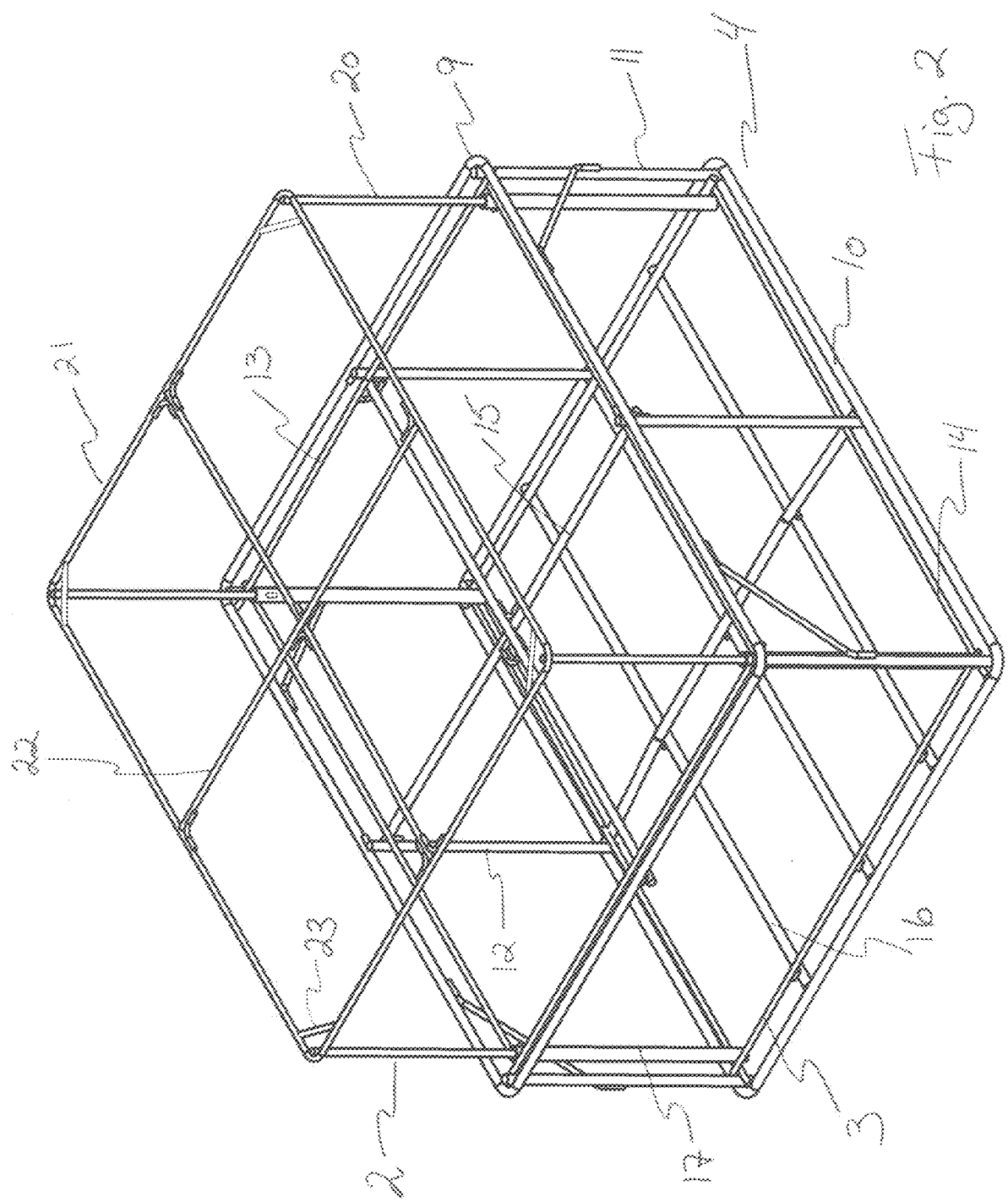

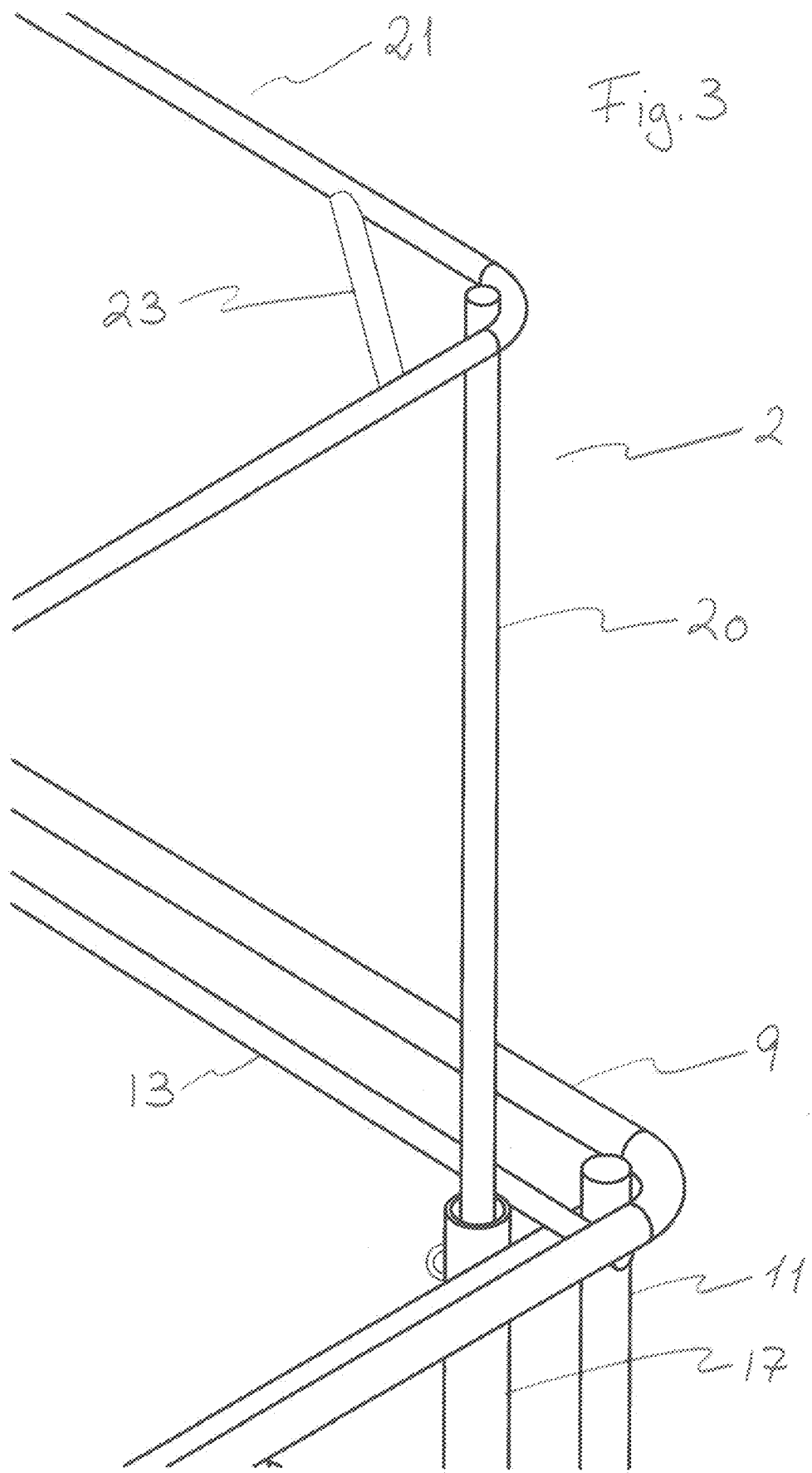

FISH POT

INTRODUCTION

The invention relates to pots for trapping large fish such as cod. In particular, the invention concerns an expandable pot for catching fish such as cod.

BACKGROUND

Pots or traps for fish such as cod, are often large rectangular rigid frame structures. These pot structures typically have dimensions of about (about 7.0'×8.0'×40") and have a weight of about 880 lb (400 kg) when empty. The outer frame structure is normally made of carbon steel which enables the pot to be heavy enough to sink to the bottom of the sea floor for fishing, as well as providing a strong enough structure to be able to hold the fish when recovering the pot from the sea. When the pot is recovered from the sea floor after fishing and is filled with fish, the pot may weigh up to about 1100-2200 lb (about 500-1.000 kg). Fishing for cod often takes place in arctic environments as e.g. in Alaska, the Bering sea, the Barents sea and northern part of Norway. The weather conditions may be hard and difficult with snow, icing conditions on the fishing vessel, strong winds and tough waves. The working conditions for the crew on deck may be very difficult and dangerous. The deck crew wear protective and warm garments including thick and warm glows. Each fishing vessel has a quota of fish to be caught. Fish pots with increased efficiency could decrease the time spent on sea fishing to fulfill the quota.

SUMMARY OF THE INVENTION

The invention provides an expandable pot for catching fish such as cod. The pot comprising a frame structure comprising a main frame structure and an extendable frame structure, wherein the extendable frame structure is provided with a number of floating elements extending the extendable frame structure from the main frame structure when the pot is immersed in water.

The extendable frame structure may be connected to the main frame structure by pipes adjustable in length. The pipes of the extendable frame structure are received by corresponding hollow tubes of the main frame structure. A number of mesh panels are attached to the frame structure. The mesh panels of the main frame structure comprising at least one entrance for fish to enter the pot. The mesh panels of the extendable frame structure comprising at least one entrance for fish to enter the pot. The frame structure may be a steel bar structure. The pot is further provided with a rope for hauling the pot from the sea, whereby hauling the pot by the rope causes retraction of the extendable top frame into the main frame. The floating elements may be made of at least one of a rubber, a foam, a cork, air/gas filled or foam filled floating devices.

The invention provides a more efficient fish pot for catching fish, enabling to hold more fish in one catch. The internal volume of the fish pot is increased when the fish pot is in a fishing position on the sea floor or in the sea. The number of entrances for the fish to swim into the pot is also increased, which means that the fish pot may potentially catch more fish during the time spent fishing in the sea. As the fish pot extends higher from the sea floor when fishing, this may also potentially increase the number of fish swimming past the pot and being attracted to the pot. As the increase in volume of the pot takes place after deployment, the fish pot does not need increased needed storage space on the deck on the fishing vessel. The fishing vessel may thus carry the same number of fish pot as before, but where each fish pot having a considerably increase in the fishing capacity.

BRIEF DESCRIPTION OF DRAWINGS

Example embodiments of the invention will now be described with reference to the following drawings, where:

FIG. 2 is a schematic view of an example fish pot with mesh panels removed showing only a frame bar structure of the pot; and FIG. 3 is a schematic view of a part of the fish pot from FIG. 2, showing one corner post of the extendable top.

DETAILED DESCRIPTION

Figure 1:
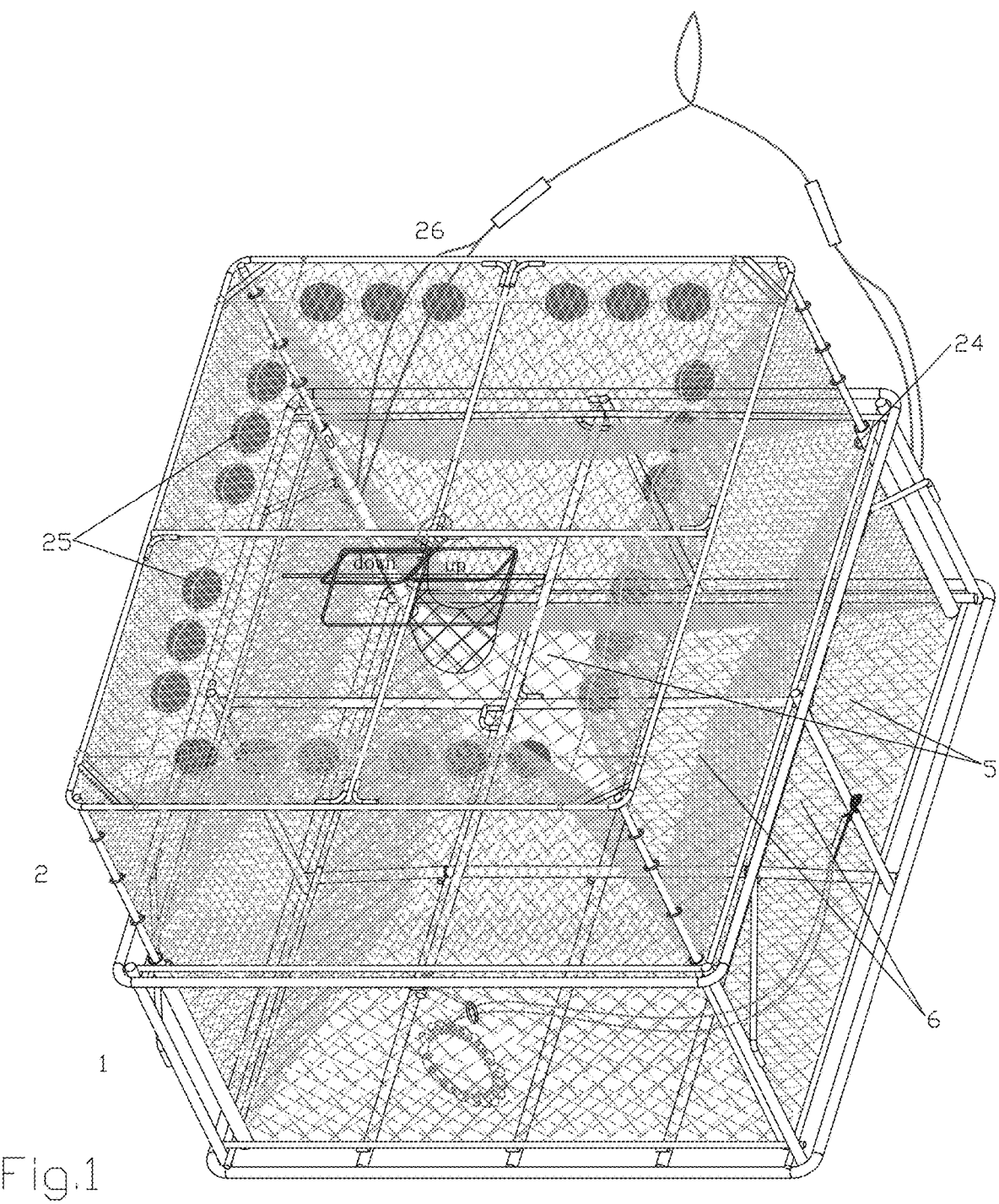
FIG. 1 is a schematic view of an example fish pot with an extendable top.

Example embodiments are described with reference to the drawings. The same reference numerals are used for the same or similar features in all the drawings and throughout the description.

FIG. 1 shows a fish pot 1, in particular for cod, with an extendable top 2. The extendable top is fully extended as would be the case when the fish pot is fishing on the sea floor. The fish pot is provided with mesh panels/webbing 5 providing a cage like structure confining the fish inside the pot. As shown in FIG. 2, where the mesh panels 5 have been removed from the fish pot, the fish pot has a bar structure forming a frame defining the shape of the fish pot. The frame also serves as a skeleton for attaching the webbing/mesh panels 5 to the fish pot. In FIG. 2 the frame structure of the fish pot is fully extended. The fish pot 1 is constructed of an outer main frame 4, an inner frame 3 and an extendable top frame 2. The outer main frame 4 is rigid and provides structural strength. The outer main frame also provides additional weight enabling the fish pot to sink through the water to the sea floor. The inner frame 3 is also rigid and provides a skeleton on to which various netting/webbing parts/mesh panels 5 may be attached forming the fish pot closure for the fish. The mesh panels/netting/webbing provide the enclosed structure preventing the fish from escaping the fish pot. Preferably the netting/webbing/mesh parts are tied to the inner frame 3. The main frame part of the fish pot in FIG. 1 has three entrances (one shown) 6 for fish to enter the fish pot. The entrances are one-way doors having a construction making it easy for the fish to swim into the fish pot, but difficult to swim out again. The entrances are adjustable by use of a closing rope. The closing rope may be e.g. an elastic woven rope or a rubber rope. The extendable top frame part of the pot has four entrances for fish to enter the pot through the netting. These four entrances are also one-way doors as explained above. The number of entrances for the fish pot depends upon the size of the fish pot. A smaller fish pot than the example in FIG. 1, may have fewer entrances, and a larger fish pot may be provided with more entrances. The entrances for the fish may be varied in size by use of a closing rope for each entrance.

The fish pot 1 has a rectangular shape in the embodiment shown in the FIGS. 1-3. The shape of the fish pot may however vary and may take other forms, e.g. in the form of a square, pyramid, rounded etc. The size and shape depend on the vessel capabilities, fishermen preferences and species of fish to be caught. A typical size for a fish pot may e.g. be 7.0'×8.0'×40" (W×L×H) and an extendable top adding 37.5" to maximum extended height of 77.5".

As shown in FIG. 2, the outer main frame 4 is constructed of an outer top frame 9 and an outer bottom frame 10. The outer bottom frame 10 is adapted to rest on the sea floor when the pot is deployed into the sea. The outer top frame 9 and outer bottom frame 10 are arranged oppositely facing each other and define the shape and width and length of the fish pot. Four support frame bars 11 are provided as corner posts for the outer top frame 9 and outer bottom frame 10 connecting the outer top frame and outer bottom frame together. Three additional support frame bars 12 are provided between the outer top frame 9 and the outer bottom frame 10 further connecting the outer top frame and outer bottom frame together and providing increased stiffening and stability of the fish pot. In the embodiment in FIG. 2, these three additional support frame bars 12 are arranged with one additional support frame bar arranged on long side and one additional support frame bar on one of the short sides. Two upper frame bars 15 are provided in a cross configuration on the outer top frame 9 for stiffening the top frame structure. Four bottom frame bars 16 are also provided in a cross configuration on the outer bottom frame 10 for stiffening and strengthening the outer bottom frame structure.

The inner frame 3 is constructed of an inner top frame 13 and an inner bottom frame 14 that are connected by a number of inner support bars 17 forming a cage like structure as shown in FIG. 2. A number of bracing bars 18 are provided on the inner frame as reinforcement parts. The embodiment shown in FIG. 2 has four inner support bars and 29 bracing bar reinforcement parts (not all shown in Figure). The four support bars 17 are arranged as corner posts of the inner frame. Inner frame bracing bars 18 (only a few of the inner frame bracing bar elements are provided with reference number in FIG. 2). The number of support bars and bracing bars may vary depending upon the required strength, size and shape of the pot. The inner frame is arranged inside the outer main frame. The inner frame 3 and the outer main frame 4 are preferably welded together, but other techniques for reliably attaching the inner frame to the outer frame may also be used.

The extendable top frame 2 is connected to the inner frame 3. The four support bars 17 forming the corner posts of the inner frame 3 are hollow pipes receiving the four corner posts 20 of the extendable top frame. In the embodiment in FIG. 2, the four hollow pipes are parallel with each other, and the four corner posts of the extendable top frame are also parallel with each other. The hollow pipes and the corner posts of the extendable top frame are provided with a stopping mechanism, stopping the support bars from further extending upwards beyond the stopping point. The extendable top frame is also provided with an upper bar frame structure 21 constituting the top part of the fish pot. The upper bar frame structure is provided with an upper bar frame cross structure 22 for stiffening and adding strength to the extendable top frame structure. The extendable top frame structure is provided with four bracing bars 23 and four half chain bars 24 also providing upper and lower securing points for ropes tying the mesh/webbing panels/netting to the fish pot frame structure. The number of frame bars, bracing bars and corner posts may vary depending on the required strength, size and shape (e.g. quadratic, pyramid etc.) of the fish pot.

The extendable top frame is provided with a number of floats 25 providing buoyancy to the extendable top frame. The floats may be of e.g. rubber, foam, cork, air/gas filled or foam filled floating devices. The floats on the extendable top frame have an upwards force of buoyancy larger than the downward force from the weight of the extendable top frame in water. When the fish pot sinks down to the sea floor, this net upward force of buoyancy on the extendable top frame, results in the extendable top frame being extended from the main frame of the fish pot as the fish pot descends through the water column and down to the sea floor. The floats are secured to the upper bar frame structure, preferably on the inside of the mesh panels. In FIG. 1, the floats are tied to the upper bar frame structure by use of a rope. In the embodiment shown in FIG. 1, there are 24 floats evenly distributed between the four sides of the upper bar frame. This provides an upwards buoyancy in water about evenly distributed around the upper bar frame corners resulting in an upwards even movement of the entire extendable top frame when the pot is sinking down in the sea towards the sea floor. When the fish pot rests on the sea floor or in a fishing position in the water, the floats make sure the fish pot is maintained in the maximum extended height as long as the fish pot is fishing.

Upon retrieval of the fish pot to the surface, the extendable top frame is retracted down into the main frame. Retraction is accomplished when hauling the fish pot from the sea. In FIG. 1, the dragrope 26 for hauling the fish pod is also connected to the extendable top frame. When hauling the fish pot up from the sea floor by use of the dragrope, the arrangement of the dragrope causes the extendable top frame to be pulled down into the main frame part of the pot.

The movement of the extendable top frame both when extending and retracting is smooth. This is due to the fit between the hollow pipes receiving the four corner posts of the extendable top frame, and also due to the even arrangement of the floats on the upper part of the top frame creating an upward force evenly distributed between the four corner posts.

The fish pot has a (pucker) string door panel for unloading the pot for fish after recovery after fishing on the sea floor and for loading the pot with bait, jars/bags before deployment into the sea.

As explained above, the inner frame serves as a structure for attaching the various mesh panels/netting to the fish pot. The mesh panels form the netting cage structure contain the fish inside the fish pot. The mesh panels are tied onto the inner frame of the fish pot by using a number of net fixing ropes. The main mesh panels in the fish pot in FIG. 1 are a bottom net attached to the bottom part of the outer main frame, entrance nets on the sides on the lower part of the fish pot and the extendable part of the fish pot provided with adjustable openings for the fish to enter the fish pot, a top net with a string panel for unloading and loading of the pot with bait, jars/bags.

The nets are fixed to the fish pot bar structure by the use of ropes. The fish pot bar structure may also be provided with rubber pipes to prevent abrasion on the netting from the surroundings when the fish pot is in use on the sea floor.

In case, the fish pot should be lost in the sea, the fish pot has a mechanism preventing the fish pot from "ghost fishing" to avoid the pot from continuing to trap fish inside the pot. To avoid ghost fishing, a part of the fish pot mesh panels are sewn together by use of a cotton thread. The cotton thread will dissolve after the fish pot has been a certain time into the sea resulting in an emergency escape opening in these mesh panels so the fish may swim out of the pot.

The inner frame 3 and the outer main frame 4 and the extendable top frame 2 of the pot, are preferably made of steel bars, preferably heavy steel or carbon steel, but other heavy and durable materials for sea water use may be also be used. Preferably the extendable top frame is made of smaller diameter steel bars than the outer frame. The extendable top frame is lighter than the lower part of the fish pot, to enable the extendable top to have a positive buoyancy caused by the floats lifting the extendable top upwards when the fish pot is sinking down towards the sea bottom. The steel bars are welded together forming the structure as detailed above. Other connecting techniques may also be envisaged. The fish pot, preferably the inner frame, is provided with pieces of zinc for catalytic protection of the fish pot.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A pot for catching fish, the pot comprising:
   a frame structure comprising
     a main frame structure, and
     an extendable top frame structure connected to the main frame structure so as to be movable relative to the main frame structure; and
   a plurality of mesh panels attached to the frame structure so as to prevent fish from entering the fish pot and escaping the fish pot through the plurality of mesh panels,
   wherein the plurality of mesh panels includes
     first mesh panels directly attached to the main frame structure, the first mesh panels being configured to prevent fish from entering and escaping the fish pot through the first mesh panels and comprising at least one first entrance for fish to enter the pot, wherein the at least one first entrance is a one way entrance which prevents fish from escaping from the fish pot through the at least one first entrance, and
     second mesh panels directly attached to the extendable top frame structure, the second mesh panels being configured to prevent fish from entering and escaping the fish pot through the second mesh panels and comprising at least one second entrance for fish to enter the pot, wherein the at least one second entrance is a one way entrance which prevents fish from escaping from the fish pot through the at least one second entrance,
   wherein the extendable top frame structure includes a plurality of floating elements arranged so as to move the extendable top frame structure upward relative to the main frame structure when the pot is descending in water toward a sea floor, and so as to maintain the extendable top frame structure in an extended position when the pot is resting on the sea floor or is in a fishing position in the water, to thereby increase an internal volume of the pot for increasing a fishing capacity of the pot.

2. The pot according to claim 1, wherein the extendable top frame structure includes an upper frame structure and a plurality of pipes extending downward from the upper frame structure, and the main frame structure includes a bottom frame and a plurality of hollow tubes extending upward from the bottom frame, the pipes of the extendable top frame structure being slidably arranged inside the hollow tubes of the main frame structure, respectively, such that the pipes of the extendable top frame structure are movable upward relative to the hollow tubes so as to extend the extendable top frame structure relative to the main frame structure when the pot is descending in water toward the sea floor.

3. The pot according to claim 1, wherein the frame structure is a steel bar structure.

4. The pot according to claim 1, further comprising a rope for hauling the pot from the sea, wherein the rope is connected to the extendable top frame structure so as to cause retraction of the extendable top frame structure downward into the main frame structure when hauling the pot from the sea.

5. The pot according to claim 1, wherein the floating elements comprise at least one of a rubber, a foam, a cork, air/gas filled floating devices, and foam filled floating devices.

6. The pot according to claim 1, wherein the pot is a cod pot.

* * * * *